(No Model.)  3 Sheets—Sheet 1.
A. N. MILLER.
MACHINE FOR CUTTING SOLES.
No. 599,722.  Patented Mar. 1, 1898.
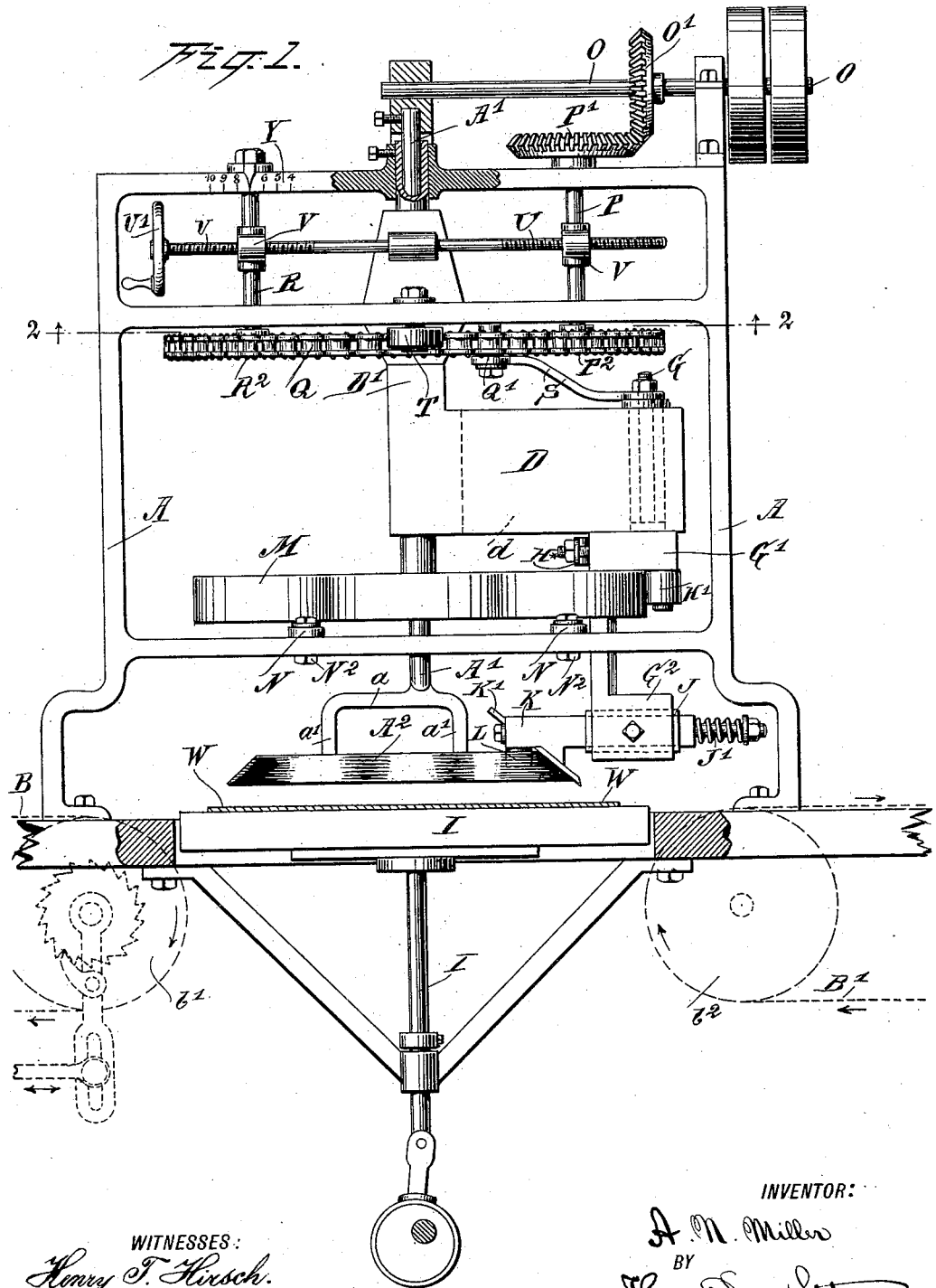
WITNESSES:
Henry T. Hirsch.
M. F. Boyle.
INVENTOR:
A. N. Miller
BY
Thomas Drew Stetson
ATTORNEY.

(No Model.) 3 Sheets—Sheet 2.
A. N. MILLER.
MACHINE FOR CUTTING SOLES.
No. 599,722. Patented Mar. 1, 1898.
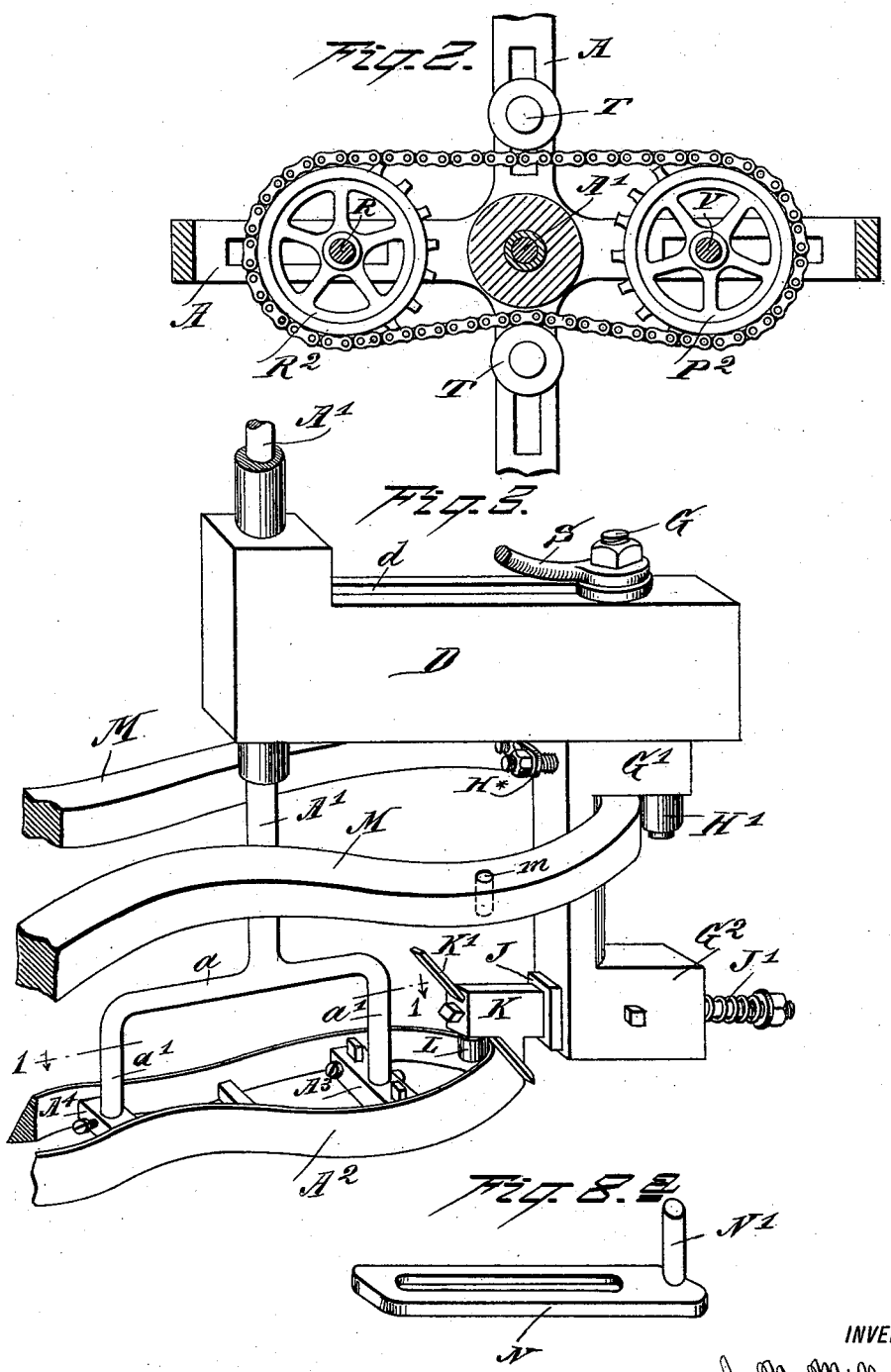
WITNESSES:
Henry T. Hirsch.
M. F. Boyle.
INVENTOR:
A. N. Miller
BY
Thomas Drew Stetson
ATTORNEY.

(No Model.) 3 Sheets—Sheet 3.
A. N. MILLER.
MACHINE FOR CUTTING SOLES.
No. 599,722. Patented Mar. 1, 1898.
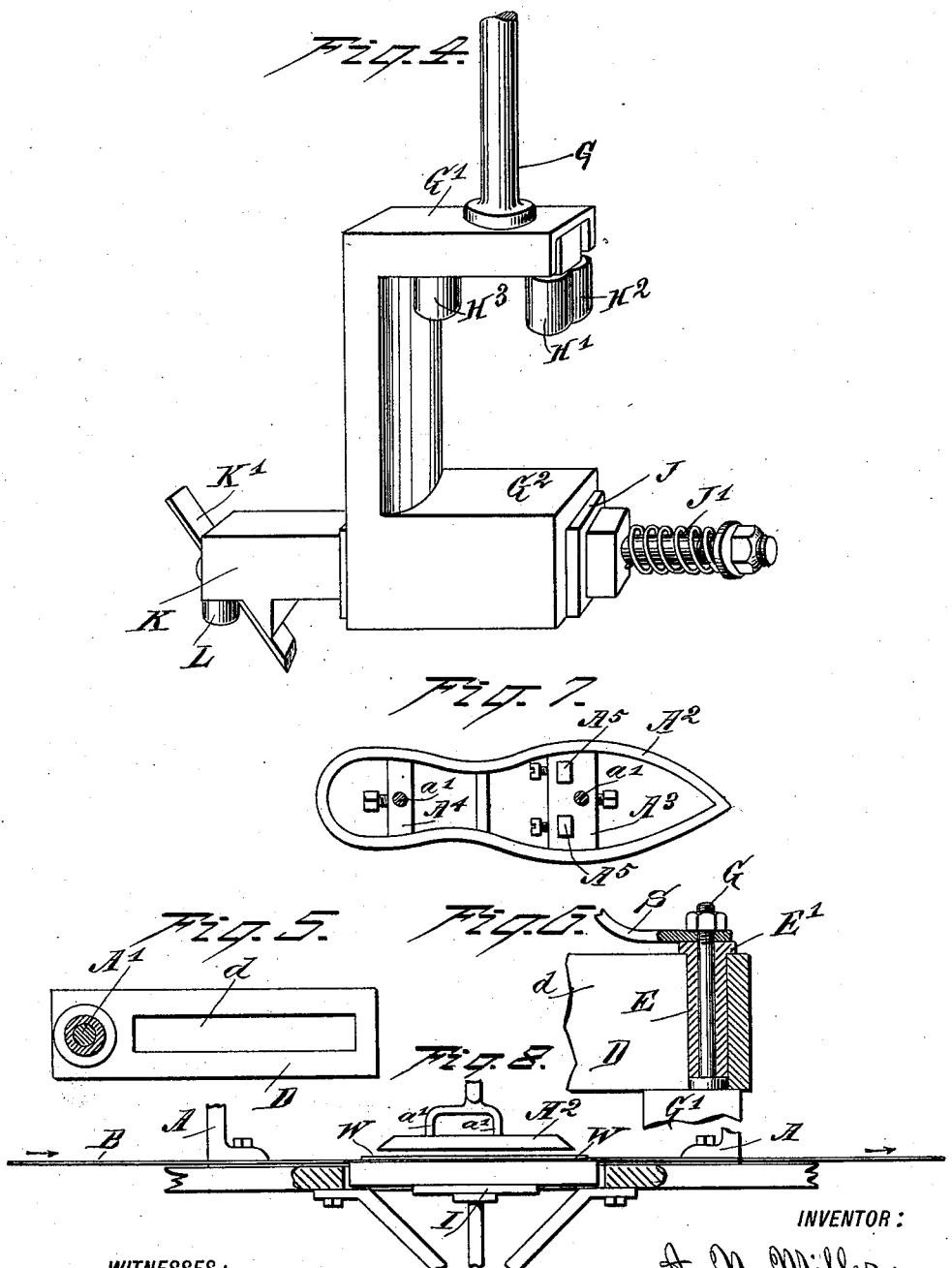
WITNESSES:
Henry F. Hirsch.
M. F. Boyle.
INVENTOR:
A. N. Miller
BY
Thomas Drew Stetson
ATTORNEY.

UNITED STATES PATENT OFFICE.

ALFRED N. MILLER, OF WILLIAMSPORT, PENNSYLVANIA.

MACHINE FOR CUTTING SOLES.

SPECIFICATION forming part of Letters Patent No. 599,722, dated March 1, 1898.

Application filed November 5, 1896. Serial No. 611,111. (No model.)

*To all whom it may concern:*

Be it known that I, ALFRED N. MILLER, a citizen of the United States, residing at Williamsport, Lycoming county, in the State of Pennsylvania, have invented a certain new and useful Improvement in Machines for Cutting Soles, of which the following is a specification.

The machine is intended to be used mainly for cutting rubber soles having the edges beveled in the ordinary manner and will be described as thus applied. It is an improvement on a machine set forth in a patent to me dated October 22, 1895, No. 548,379. It makes the action more smooth, and the soles are cut with greater accuracy and perfection. Instead of swiveling the knife by rollers working against the edge of the templet, against which the rubber is pressed, I swivel the knife by rollers acting against the larger endless railway or "track" above.

The accompanying drawings form a part of this specification and represent what I consider the best means of carrying out the invention.

Figure 1 is a view showing in vertical section the main portion of my improved sole-cutting machine. Fig. 2 is a bottom plan view on the line 2 2 in Fig. 1, showing the transmission-gearing for driving the central hollow shaft, one of the belt-tightening provisions being also illustrated. Fig. 3 is a perspective view showing more prominently the parts composing the upper portion of the machine. Fig. 4 is a perspective view of the knife-carriage viewed in a position different from that shown in Fig. 1. Figs. 5 and 6 are a plan and sectional view, respectively, illustrating the movable connection of the chain-engaged link with the knife-carrying block. Fig. 7 is a sectional plan view taken on line 1 1, Fig. 3, and showing the pattern or templet against which the material is clamped while being cut. Fig. 8 is an outline view illustrating the employment of a single apron led beneath the pattern or templet. Fig. 8ª is a perspective view showing one of the plates for adjusting the position of the track or guide.

Similar letters of reference indicate corresponding parts in all the figures where they appear.

I employ a fixed framing A, of cast-iron or other suitable material. The sheet of rubber W is carried forward on endless aprons B B', which run around drums $b'$ $b^2$, and these are worked simultaneously at the required periods to feed forward the material at the proper intervals.

I is a rising and sinking support mounted in the space between the drums $b'$ and $b^2$ and having its upper surface of pine or analogous material which may allow the point of the knife to cut slightly into it without injury. This is lowered after each operation to allow the material to be fed forward and is raised to clamp the material firmly between itself and the pattern or templet $A^2$ to allow the cutting of a line around more or less close to its border.

To the top of the framing A is fixed a sufficiently stout vertical rod A', carrying at its lower end the templet $A^2$, having an outline approximating that of the sole to be cut, but a little smaller. The upper portion of the interior of this templet is accurately finished.

I employ a track or guide M, having a form approximating that of the outline to be cut, but larger, and I make it in two or more parts, so that they may be detached and removed and others substituted when it is required to cut soles of a different form.

N N are adjustable brackets which are slotted and fixed on the framing A by bolts $N^2$, each bracket being provided with an upright arm or pin N', which engages in a corresponding hole $m$ in the track M. Changes may be made with facility by simply lifting off the portions of the track and introducing the substitutes and correspondingly shifting the positions of the brackets N N', if it shall be necessary.

D is an arm extending radially from a sleeve D', which plays around the rod A'. The arm has a radial slot $d$ nicely finished. E is a shifting block adapted to play inward and outward in such slot and supported by a flange E', which rests and slides on the upper side of the arm D.

G is a vertical stem fitted with liberty to turn in the block E and supporting immediately below the arm D a stout casting G', forming the body of the knife-carriage, and which is free to swivel on the pin G and performs important functions.

H' H² are rollers which are free to turn on pins extending downward therefrom. As the arm D and its connections are revolved these rollers run on the nicely-finished outer face of the track.

H³ is a roller in triangular relation to the other rollers and correspondingly turning easily on a pin carried in the same casting and adapted to roll against the nicely-finished inner surface of the track M. These rollers insure that the casting G' shall be partially rotated in one direction and the other and also moved outward and inward as the parts traverse around the irregular track M. The casting G' extends downward inside of the track M and is expanded at a lower level into a considerable and outwardly-extending housing G³, containing an adjustable box J, in which is allowed to play horizontally a tool-carrier K, firmly holding the knife K'. A pin extending down from the inner end of this tool-carrier K carries a roller L, which is traversed around on the nicely-finished interior of the pattern or templet A² and is urged into contact therewith by the tension of a spring J', (see Figs. 3 and 7,) which contributes still further to determine the exact position of the knife.

The box J may be shifted outward and inward and confined in any adjusted position by the pinching-screw C. The pins which support the rollers H' H² are mounted on stout springs H³, so that they have a little freedom to yield to allow for wear or imperfect workmanship.

O is the horizontal shaft, revolved by a steam-engine or other suitable means and carrying a beveled gear-wheel O', which engages with a beveled gear-wheel P' on an upright shaft P. On the lower end of this shaft P is carried a sprocket-wheel P². This wheel actuates a pitch-chain Q, which traverses around a sprocket-wheel R², carried on the lower end of the shaft R. A pin Q' on the under side of the chain Q is connected by a link S to the head of the stem G. As the stem G and its connected casting G' and the connected tool-carrying parts are moved radially outward and inward in the slot $d$ in the arm D the pitch-chain Q, by its traversing a nearly coincident path, imparts a nearly uniform rapid and effective motion to the tool-carrying parts in all positions.

A³ is a bar extending across the bottom of the templet A² and having raised letters or other devices adapted to give a distinguishing mark to each sole as it is cut.

The shaft R is mounted in sliding bearings which are adapted to be moved toward and from the shaft P, the extent of which motions may be noted by an index Y, traversing over graduations on the frame.

T T are tightening-pulleys which may be adjusted to press inward to any required degree on the chain Q.

U is a right-and-left screw operated by a hand-wheel U' and engaging in threaded sleeves V, which are fitted, respectively, on the shafts P and R. The mid-length of this screw is steadied in a boss in the fixed portion. By tightening or relaxing the pressure of the tightening-pulleys T and properly turning the screw U by its hand-wheel U' the shaft R can be shifted to the right or left, so as to more properly adapt the apparatus for cutting large or small soles.

The operation will be readily understood. As the sleeve D' revolves freely on the fixed rod A' its arm D supports the casting G' G², with liberty for the latter to revolve on the short shaft G, held loosely in the block E, which latter is free to slide radially outward and inward in the slot $m$. The two rollers H' H², traveling around on the outer side of the trackway M, and the single roller H³, correspondingly traveling around on the inner side of the same track, will compel the casting G' G² and its attached parts to move outward and inward at the proper points in the traverse and will also cause the casting to partially revolve in one direction and the other by turning on the shaft G. This will cause the knife which is carried in the carriage to move outward and inward to the proper extent and also to turn horizontally in one direction and the other, the parts being so formed that the knife will by thus turning be always presented with its cutting edge in the direction in which the knife is to move. The spring mounting of the outer rollers H' H² allows for slight irregularities and insures that the carriage and the knife supported therein are always firmly steadied. This insures the approximately correct position of the knife in thus moving around in the graceful curves and sometimes nearly or quite angular changes of direction required in making each circuit to cut a sole; but in order to still further steady the knife and insure a still more accurate following of the correct line the roller L immediately adjacent to the knife is caused to also contribute to the guiding by running around on the smoothly-finished inner face of the raised edge of the templet A². The intermittent feed of the apron is so timed that the material will be released from being pressed against the pattern upon the completion of each sole-cutting operation, the cut soles and scraps being moved out of position to one end of the machine, where they are separated so that the soles drop.

An important feature connected with the present improvements consists in provisions for using removable patterns or templets A², so that different sizes can be interchangeably adjusted to permit different sizes of soles to be cut.

Referring to Figs. 1 and 7, it will be seen that the lower end of the fixed rod A' terminates in a horizontally-extended portion $a$, bent at its ends to form short vertical members $a'$ $a'$, which are designed to fit in suitable openings in cross-bars $A^3$ $A^4$, extending across the bottom of the templet, binding-screws being employed to rigidly connect the pattern or templet on the members. One of the cross-bars $A^3$ has an additional opening or openings in which dies $A^5$ may be clamped, designed to project slightly below the bottom plane of the templet to stamp or impress the letter of the last and the number of the shoe on the material when it is pressed against the pattern. The yielding and adjustable character of the knife head and block provides for the differences in the cutting-line in different sizes of patterns.

One of the advantages due to this improvement lies in the increased perfection with which the knife is turned to always present its edge in the line which is to be cut, the rollers $H'$ $H^2$ traversing on the outer face and the roller $H^3$ traversing on the inner face of the endless track M, which latter is considerably larger than the sole to be cut, insure a prompt swiveling action of the knife and its operating parts, which are admirably adapted to make the nearly angular changes of direction which are required at the toes of some styles of soles.

Modifications may be made without departing from the principle or sacrificing the advantages of the invention.

The pitch-chain Q may be lengthened and shortened by inserting or taking out links.

Instead of using two belts as carriers I can employ a single belt running continuously across over the presser I, lowering the latter, of course, sufficiently to allow for the thickness of the belt. Fig. 8 shows such an arrangement. When thus arranged, care must be taken to adjust the knife so that it shall not extend appreciably into the carrier-belt.

I have described the material as rubber, but it may be leather or any other ordinary or suitable material.

I claim as my invention—

1. In a sole-cutting machine, a pattern or templet, a horizontally-revoluble arm longitudinally slotted, a revoluble swiveled knife-support adapted to move radially along the slot, and a trackway M with which the support is in engagement, in combination with a horizontal sprocket-chain Q pivotally connected to the knife-support to move the same and the arm, substantially as specified.

2. In a sole-cutting machine, a pattern or templet, a horizontally-revoluble arm longitudinally slotted, a revoluble swiveled knife-support adapted to move radially along the slot, and a trackway M with which the support is in engagement, in combination with a horizontal sprocket-chain Q pivotally connected to the knife-support, to move the same and the arm together with the adjustable pulleys T, T, bearing against the intermediate portions of the chain at each side, all arranged for joint operation as and for the purposes specified.

3. In a sole-cutting machine, a pattern or templet, a horizontally-revoluble arm longitudinally slotted, a revoluble swiveled knife-support, adapted to move radially along the slot, and sprocket-chain Q pivotally connected to the knife-support to move the same and the arm, in combination with the trackway M of larger dimensions than the pattern or templet and with which trackway, the support is in engagement, substantially as specified.

4. In a sole-cutting machine, a pattern or templet, a revoluble swiveled knife-support having the yielding bearing-rollers $H'$, $H^2$, $H^3$, triangularly-arranged sprocket-chain Q pivotally connected to the support, in combination with the trackway M with which the said rollers engage, substantially as specified.

5. In a sole-cutting machine, a pattern or templet, a revoluble swiveled knife-support carrying an adjustable knife-block, a spring-yielding knife-carrying portion in said block and the sprocket-chain Q pivotally connected to the revoluble support, in combination with the trackway M with which said support engages, substantially as specified.

6. In a sole-cutting machine, a pattern or templet, a revoluble arm D having an extended slot $d$, a knife-support having a stem seated in said slot, in combination with a horizontal sprocket-chain Q, pivotally connected to said stem and guided to travel, substantially as herein specified.

7. In a sole-cutting machine, a removable pattern or templet, a revoluble swiveled knife-support having a positively-adjusted and spring-yielding knife, in combination with a chain Q connected to the said support for actuating the same, and a slotted arm D, moved by said support but guiding it in its in-and-out movements, substantially as herein specified.

In testimony that I claim the invention above set forth I affix my signature in presence of two witnesses.

ALFRED N. MILLER.

Witnesses:
LEVI SWEGAR,
C. R. BEVIER.